US008024433B2

(12) United States Patent
Mason et al.

(10) Patent No.: US 8,024,433 B2
(45) Date of Patent: Sep. 20, 2011

(54) MANAGING APPLICATION RESOURCES

(75) Inventors: W. Anthony Mason, Milford, NH (US); Peter G. Viscarola, Mont Vernon, NH (US); Mark J. Cariddi, Merrimack, NH (US); Scott J. Noone, Nashua, NH (US)

(73) Assignee: OSR Open Systems Resources, Inc., Amherst, NH (US)

( * ) Notice: Subject to any disclaimer, the term of this patent is extended or adjusted under 35 U.S.C. 154(b) by 1092 days.

(21) Appl. No.: 11/789,147

(22) Filed: Apr. 24, 2007

(65) Prior Publication Data
US 2008/0270587 A1    Oct. 30, 2008

(51) Int. Cl.
*G06F 15/177* (2006.01)
(52) U.S. Cl. ........................................ 709/221
(58) Field of Classification Search .................. 709/220, 709/221
See application file for complete search history.

(56) References Cited

U.S. PATENT DOCUMENTS

| | | |
|---|---|---|
| 4,135,240 A | 1/1979 | Ritchie |
| 4,959,811 A | 9/1990 | Szczepanek |
| 4,984,153 A | 1/1991 | Kregness et al. |
| 5,027,395 A | 6/1991 | Anderson et al. |
| 5,488,701 A | 1/1996 | Brady et al. |
| 5,506,983 A | 4/1996 | Atkinson et al. |
| 5,530,850 A | 6/1996 | Ford et al. |
| 5,537,588 A | 7/1996 | Engelmann et al. |
| 5,551,003 A | 8/1996 | Mattson et al. |
| 5,574,898 A * | 11/1996 | Leblang et al. ................ 1/1 |
| 5,606,983 A | 3/1997 | Monty et al. |
| 5,652,879 A | 7/1997 | Harris et al. |
| 5,664,178 A | 9/1997 | Sinofsky |
| 5,706,504 A | 1/1998 | Atkinson et al. |
| 5,715,441 A | 2/1998 | Atkinson et al. |
| 5,734,861 A | 3/1998 | Cohn et al. |
| 5,752,252 A * | 5/1998 | Zbikowski et al. .............. 1/1 |
| 5,757,915 A | 5/1998 | Aucsmith et al. |
| 5,764,880 A | 6/1998 | Gerdt et al. |
| 5,781,797 A | 7/1998 | Crick et al. |
| 5,799,324 A | 8/1998 | McNutt et al. |
| 5,802,344 A | 9/1998 | Menon et al. |
| 5,815,707 A * | 9/1998 | Krause et al. ................. 719/321 |
| 5,832,515 A | 11/1998 | Ledain et al. |
| 5,857,207 A | 1/1999 | Lo et al. |
| 5,873,097 A | 2/1999 | Harris et al. |
| 5,923,878 A * | 7/1999 | Marsland ..................... 717/139 |
| 5,991,893 A | 11/1999 | Snider |
| 5,996,054 A | 11/1999 | Ledain et al. |
| 6,006,227 A | 12/1999 | Freeman et al. |

(Continued)

OTHER PUBLICATIONS

"MAC OS X ABI Mach-O File Format Reference" Oct. 3, 2006.*

(Continued)

*Primary Examiner* — Larry Donaghue
(74) *Attorney, Agent, or Firm* — K&L Gates LLP

(57) ABSTRACT

Methods of managing application resources in a computer system. The methods may comprise the steps of determining a configuration of the computer system and receiving a request to access an application resource. The methods may also comprise the step of directing the request to a data file. The data file may include a plurality of streams, and each of the plurality of streams may comprise a configuration-specific version of the application resource. In various embodiments, the methods may also comprise the step of directing the request to a first stream of the plurality of streams. The first stream may comprise version of the application resource specific to the configuration. Various system embodiments are also provided.

21 Claims, 10 Drawing Sheets

U.S. PATENT DOCUMENTS

| | | | |
|---|---|---|---|
| 6,021,408 | A | 2/2000 | Ledain et al. |
| 6,021,509 | A | 2/2000 | Gerdt et al. |
| 6,038,668 | A | 3/2000 | Chipman et al. |
| 6,065,100 | A | 5/2000 | Schafer et al. |
| 6,079,047 | A * | 6/2000 | Cotugno et al. ............. 714/807 |
| 6,101,186 | A | 8/2000 | Craig |
| 6,108,420 | A | 8/2000 | Larose et al. |
| 6,128,630 | A | 10/2000 | Shackelford |
| 6,148,368 | A | 11/2000 | DeKoning |
| 6,240,527 | B1 | 5/2001 | Schneider |
| 6,260,036 | B1 | 7/2001 | Almasi et al. |
| 6,321,239 | B1 | 11/2001 | Shackelford |
| 6,336,164 | B1 | 1/2002 | Gerdt et al. |
| 6,347,397 | B1 * | 2/2002 | Curtis ........................... 717/170 |
| 6,366,987 | B1 | 4/2002 | Tzelnic et al. |
| 6,367,008 | B1 * | 4/2002 | Rollins ........................ 713/100 |
| 6,377,958 | B1 | 4/2002 | Orcutt |
| 6,381,682 | B2 | 4/2002 | Noel et al. |
| 6,418,509 | B1 | 7/2002 | Yanai et al. |
| 6,430,548 | B1 | 8/2002 | Deis et al. |
| 6,438,594 | B1 * | 8/2002 | Bowman-Amuah .......... 709/225 |
| 6,449,688 | B1 | 9/2002 | Peters et al. |
| 6,490,664 | B1 | 12/2002 | Jones et al. |
| 6,526,570 | B1 * | 2/2003 | Click et al. .................... 717/146 |
| 6,529,909 | B1 | 3/2003 | Bowman-Amuah |
| 6,535,949 | B1 | 3/2003 | Parker |
| 6,577,254 | B2 | 6/2003 | Rasmussen |
| 6,597,812 | B1 | 7/2003 | Fallon et al. |
| 6,601,104 | B1 | 7/2003 | Fallon |
| 6,604,158 | B1 | 8/2003 | Fallon |
| 6,624,761 | B2 | 9/2003 | Fallon |
| 6,625,671 | B1 | 9/2003 | Collette et al. |
| 6,628,411 | B2 | 9/2003 | Miller et al. |
| 6,633,244 | B2 | 10/2003 | Avery et al. |
| 6,633,883 | B2 | 10/2003 | Koskas |
| 6,643,405 | B1 | 11/2003 | Sako |
| 6,643,652 | B2 | 11/2003 | Helgeson et al. |
| 6,654,851 | B1 | 11/2003 | McKean |
| 6,657,565 | B2 | 12/2003 | Kampf |
| 6,664,903 | B2 | 12/2003 | Kugai |
| 6,704,839 | B2 | 3/2004 | Butterworth et al. |
| 6,711,709 | B1 | 3/2004 | York |
| 6,732,125 | B1 | 5/2004 | Autrey et al. |
| 6,738,863 | B2 | 5/2004 | Butterworth et al. |
| 6,741,747 | B1 | 5/2004 | Burns et al. |
| 6,775,781 | B1 | 8/2004 | Phillips et al. |
| 6,782,319 | B1 | 8/2004 | McDonough |
| 6,785,768 | B2 | 8/2004 | Peters et al. |
| 6,795,640 | B1 | 9/2004 | Honda |
| 6,795,897 | B2 | 9/2004 | Benveniste et al. |
| 6,847,681 | B2 | 1/2005 | Saunders et al. |
| 6,856,993 | B1 | 2/2005 | Verma et al. |
| 6,901,403 | B1 | 5/2005 | Bata et al. |
| 6,944,619 | B2 | 9/2005 | Gruenwald |
| 6,983,456 | B2 * | 1/2006 | Poznanovic et al. .......... 717/133 |
| 7,051,031 | B2 | 5/2006 | Schein |
| 7,085,766 | B2 | 8/2006 | Keith, Jr. |
| 7,088,823 | B2 | 8/2006 | Fetkovich |
| 7,107,267 | B2 | 9/2006 | Taylor |
| 7,191,189 | B2 | 3/2007 | Bhatti |
| 7,340,581 | B2 | 3/2008 | Gorobets et al. |
| 7,370,319 | B2 | 5/2008 | Pensak et al. |
| 7,392,383 | B2 | 6/2008 | Basibes et al. |
| 7,444,625 | B2 * | 10/2008 | Anwar et al. .................. 717/140 |
| 7,502,713 | B2 * | 3/2009 | Hillier et al. .................. 702/181 |
| 7,523,221 | B2 | 4/2009 | Hillberg |
| 7,536,418 | B2 | 5/2009 | Buchsbaum et al. |
| 7,802,082 | B2 * | 9/2010 | Kruse et al. ....................... 713/1 |
| 2001/0056460 | A1 * | 12/2001 | Sahota et al. ................. 709/201 |
| 2002/0052868 | A1 | 5/2002 | Mohindra et al. |
| 2002/0073066 | A1 | 6/2002 | Coutts et al. |
| 2002/0143735 | A1 | 10/2002 | Ayi et al. |
| 2003/0110478 | A1 * | 6/2003 | Duesterwald et al. ......... 717/137 |
| 2003/0123446 | A1 | 7/2003 | Muirhead et al. |
| 2004/0015958 | A1 | 1/2004 | Veil et al. |
| 2004/0167916 | A1 | 8/2004 | Basso et al. |
| 2004/0186920 | A1 | 9/2004 | Birdwell et al. |
| 2004/0250247 | A1 * | 12/2004 | Deeths et al. ................. 717/175 |
| 2005/0144189 | A1 | 6/2005 | Edwards et al. |
| 2005/0240966 | A1 | 10/2005 | Hindle et al. |
| 2006/0031246 | A1 | 2/2006 | Grayson |
| 2006/0070076 | A1 | 3/2006 | Ma |
| 2006/0101025 | A1 | 5/2006 | Tichy et al. |
| 2006/0123250 | A1 | 6/2006 | Maheshwari et al. |
| 2006/0190417 | A1 * | 8/2006 | Hilkemeyer et al. ......... 705/400 |
| 2006/0195476 | A1 * | 8/2006 | Nori et al. .................. 707/104.1 |
| 2006/0277153 | A1 | 12/2006 | Mason et al. |
| 2007/0100930 | A1 * | 5/2007 | Moon et al. ................... 709/200 |
| 2008/0134154 | A1 * | 6/2008 | Patel et al. .................... 717/139 |
| 2009/0249277 | A1 * | 10/2009 | Prakash ........................ 717/100 |

OTHER PUBLICATIONS

U.S. Appl. No. 11/505,582, filed Aug. 17, 2006.
U.S. Appl. No. 11/509,391, filed Aug. 24, 2006.
U.S. Appl. No. 11/844,102, filed Aug. 23, 2007.
Office Action issued on Jul. 20, 2007 in U.S. Appl. No. 11/145,433.
Office Action (Interview Summary) issued on Nov. 14, 2007 in U.S. Appl. No. 11/145,433.
Response to Nov. 14, 2007 Office Action (Interview Summary) filed Dec. 4, 2007 in U.S. Appl. No. 11/145,433.
Burrows et al., "On-line Data Compression in a Log-structured File System," proceedings of the Fifth International Conference on Architectural Support for Programming Languages and Operating Systems, Oct. 12-15, 1992, ACM Press, pp. 1-21.
Rosenblum, Mendel and John K. Ousterhout, "The Design and Implementation of a Log-Structured File System," ACM Transactions on Computer Systems, vol. 10, No. 1, Feb. 1992; pp. 26-52.
"Windows Streams—An Introduction to File System Streams," printed from http://www.osronline.com, The NT Insider, vol. 13, Issue 2, Mar.-Apr. 2006, Apr. 17, 2006, 6 pages.
"Sponsor Sessions," printed from http://microsoft.com/whdc/driverdevcon/ddctracks2005/d05_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Office Action issued on Mar. 19, 2008 in U.S. Appl. No. 11/145,433.
Office Action (Interview Summary) issued on May 23, 2008 in U.S. Appl. No. 11/145,433.
Office Action issued on Sep. 16, 2008 in U.S. Appl. No. 11/145,433.
Office Action issued on Sep. 8, 2008 in U.S. Appl. No. 11/505,582.
Office Action issued on Aug. 3, 2009 in U.S. Appl. No. 11/145,433.
Office Action issued on Dec. 8, 2009 in U.S. Appl. No. 11/509,391.
Office Action issued on Dec. 15, 2009 in U.S. Appl. No. 12/388,712.
Office Action (Interview Summary) issued on Feb. 1, 2010 in U.S. Appl. No. 11/145,433.
Office Action issued on Mar. 2, 2010 in U.S. Appl. No. 11/844,102.
U.S. Appl. No. 12/388,712, filed Feb. 19, 2009.
Office Action issued on Jul. 12, 2010 in U.S. Appl. No. 11/509,391.
Office Action issued on May 20, 2010 in U.S. Appl. No. 12/388,712.
Notice of Allowance mailed Jul. 1, 2010 in U.S. Appl. No. 12/388,712.
Examiner's Answer issued on Jul. 7, 2010 in U.S. Appl. No. 11/145,433.

* cited by examiner

MANAGING APPLICATION RESOURCES

BACKGROUND

Computer systems with different hardware and software configurations have different requirements for resources. For example, different computer processor families utilize different, and usually incompatible, instruction sets to perform their operations. Accordingly, applications designed to run on more than one processor family must include distinct binary instruction sets for each processor family. Also, various system resources (e.g., shell scripts, configuration data, etc.) are specific to a particular operating system, application, or other system parameter. For example, applications tailored to an APPLE MACINTOSH computer system will not run on an MICROSOFT WINDOWS machine, and visa versa. Because of these system differences, software packages, such as operating systems, word processing applications, spreadsheet applications, etc., must be produced with different versions for different system configurations.

Understandably, this creates a great deal of cost and administrative complexity. For example, software developers and manufacturers are required to create individual versions of their software for each hardware and software configuration that they want to support. Software distributors and retailers are also required to stock multiple versions of each software product, one for each architecture and system configuration to be supported. At best, this increases the stocking and administrative costs of the retailers. At worst, it can create confusion among consumers and may cause some consumers to purchase the wrong software version.

Software compatibility issues also add to the cost and complexity of administering a computer or computer system. For example, a software application may be designed and/or installed with particular software components (e.g., the DLL's, the drivers, etc.). Oftentimes, new versions of the software components are not backward compatible with the software application. When the non-backward compatible new versions are installed, for example, during the installation of another software application, the original software application installation may be rendered non-functional. It will be appreciated that this can create a great deal of expense and headache for system administrators.

SUMMARY

In one general aspect, embodiments of the invention are directed to methods of managing application resources in a computer system. The methods may comprise the steps of determining a configuration of the computer system and receiving a request to access an application resource. The methods may also comprise the step of directing the request to a data file. The data file may include a plurality of streams, and each of the plurality of streams may comprise a configuration-specific version of the application resource. In various embodiments, the methods may also comprise the step of directing the request to a first stream of the plurality of streams. The first stream may comprise a version of the application resource specific to the configuration. Various system embodiments are also provided.

In another general aspect, embodiments of the present invention are directed to other methods of managing application resources in a computer system. The methods may comprise the step of directing a request for an application resource to a data file. The data file may comprise a plurality of streams comprising configuration-specific versions of the application resource and a default stream comprising an executable code. The methods may also comprise the step of executing the executable code. Executing the executable code may cause at least one processor associated with the computer system to perform the steps of: determining a configuration of the computer system; selecting a stream of the data file that comprises a version of the application resource specific to the configuration; and returning the version of the application resource specific to the configuration in response to the request.

In yet another general aspect, embodiments of the present invention are directed to still other methods of managing application resources in a computer system. The methods may comprise the step of executing an application. The application may be contained in one or more streams of a data file. The methods may also comprise the steps of receiving a request from the application to access a first application resource; retrieving the first application resource from a second stream of the data file; and returning the first application resource in response to the request.

BRIEF DESCRIPTION OF THE FIGURES

Embodiments of the present invention are described herein, by way of example, in conjunction with the following figures, wherein.

DETAILED DESCRIPTION OF THE INVENTION

Various embodiments of the present invention may be used to manage application resources (e.g., executables, dynamically linked libraries (DLL's), data units, etc.). In various embodiments, hardware specific application resources may be selected, for example, at run-time. Also, in various embodiments, application resources may be associated with a given application, for example, in a way that makes it less likely that the application resources will be overwritten or deleted (e.g., during a system update, during the installation of another application, etc.).

Figure 1:
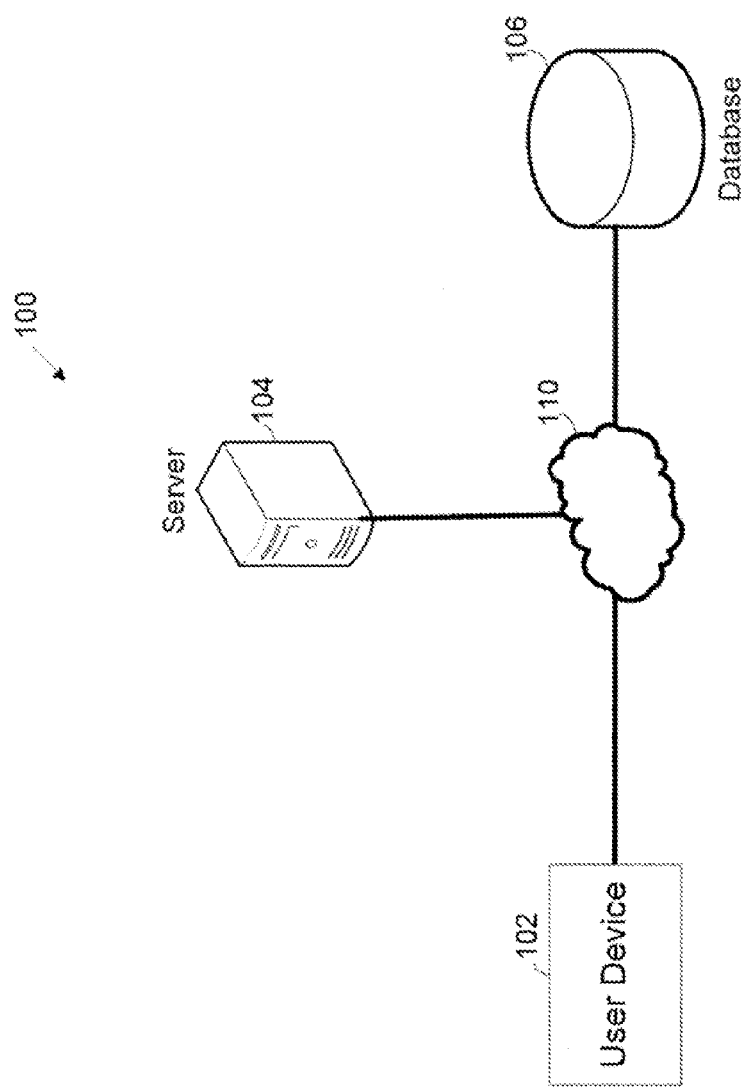
FIG. 1 shows a diagram of a computer system according to various embodiments of the present invention.

FIG. 1 shows a computer system 100 that may be used in the implementation of various embodiments. The computer system 100 may include various computing devices and/or constructs. For example, the computer system 100 may include one or more user devices 102, one or more servers 104, one or more databases 106, etc. A network 110 may provide connectivity between the devices 102, 104, 106 according to any suitable wired or wireless method.

The various devices 102, 104, 106 of the computer system 100 may generally store resources and/or execute applications that allow users (not shown) of the system 100 to perform various tasks, (e.g., use and/or manipulate the resources). User devices 102 may include any kind of device that allows a user to execute an application, or access another device that may execute an application (e.g., server 104). Example user devices 102 include a desktop computer, a laptop computer, a handheld computer, a personal digital assistant (PDA), etc. The user devices 102 may be used to monitor and/or manipulate applications running on other components of the system 100 (e.g., the server 104), or access resources stored on other components of the system 100 (e.g., database 106). In various embodiments, however, user devices 102 may also store resources and/or execute applications.

Figure 2:
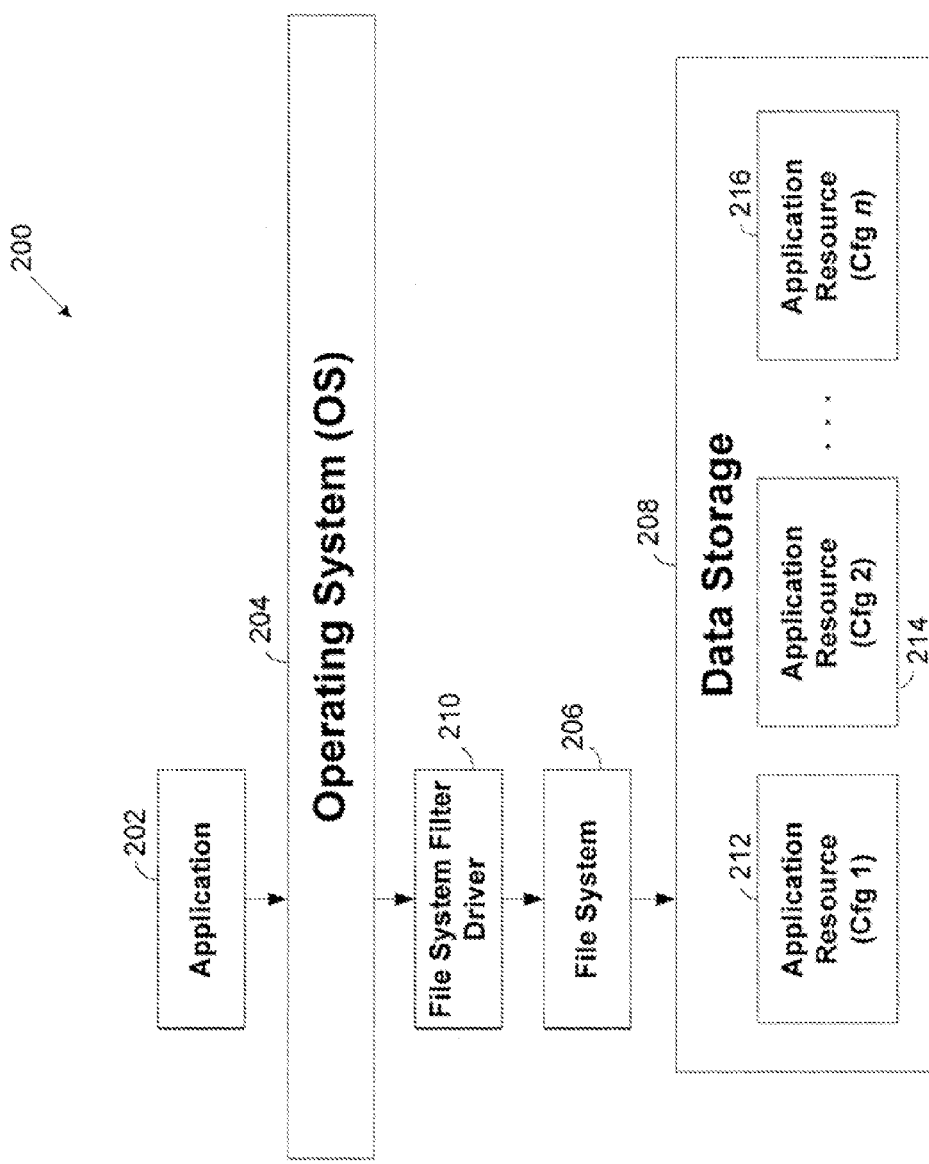
FIG. 2 shows a diagram of a system architecture according to various embodiments of the present invention.

FIG. 2 shows a block diagram, according to various embodiments, of a system architecture 200 for managing application resources. The system architecture 200 may include one or more examples of an application 202, an operating system 204, a file system 206 and data storage 208. It will be appreciated that the architecture 200 may be implemented on one component of the computer system 100 (e.g., a user device 102, a server 104, a database 106, etc.), or may be implemented across multiple components of the system.

The application 202 of the system architecture 200 may include a group of one or more application resources. The application resources may be executed and/or accessed by a processor or processors of one or more of the devices 102, 104, 106. When executed, the application 202 may perform at least one function such as, for example, providing e-mail service, providing word processing, providing financial management services, performing administrative tasks for the system 200, etc. The application 202 may access different application resources, for example, by generating access requests. The access requests may be handled by other components of the architecture 200 as described in more detail below. It will be appreciated that the architecture 200 may, in various aspects, include additional applications (not shown).

In various embodiments, the application 202 may access various system resources, such as application resources, data units, external hardware devices, etc., via operating system 204. The operating system 204 may be any suitable operating system. For example, in various non-limiting embodiments, the operating system 204 may be any version of MICROSOFT WINDOWS, any UNIX operating system, any Linux operating system, OS/2, any version of MAC OS, etc. In various embodiments, each computer device 102, 104, 106, 108 may run its own instance of an operating system 204. The devices 102, 104, 106 of the computer system 100 may in various embodiments run the same type of operating system 204 or different types. The operating system 204 may provide services to the application 202 that facilitate the application's 202 functions. For example, the operating system 204 may allow the application 202 to access and manipulate application resources as well as other data units stored at data storage 208.

Components of the application 202, data utilized by the application 202 as well as components and or data for other applications (e.g., resources) may be stored at data storage 208. Data storage 208 may include any kind of storage drive capable of storing data in an electronic or other suitable computer-readable format. In certain non-limiting embodiments, data storage 208 may include a single fixed disk drive, an array of disk drives, an array of disk drives combined to provide the appearance of a larger, single disk drive, a solid state drive, etc. Data storage 208 may be physically located at any device 102, 104, 106, 108 of the computer system 100. For example, data storage 208 may include various drives accessible over the network 110. In various embodiments, all or a part of data storage 208 may be located at database 106 and may be accessed through the network 110 by the other components, such as user devices 102, servers 104, etc.

File system 206 may be an organization system for logically and physically organizing data present at the data storage 208. In various non-limiting embodiments, the file system 206 may be a native file system included with the operating system 204, described below or a third party file system. The file system 206 may organize data units into data files, and manage the location of data files in data storage 208. Each data file may include one or more data units. The file system 206 may be, for example, specific to a computer device 102, 104, 106 or to particular drives making up data storage 208. In various embodiments, a single file system 206 may manage associations between data files and physical locations for data storage 208 located across the computer system 100. The file system 206 may be any suitable file system including, as non-limiting examples, File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), Local File System (DCE/LFS), etc. A file system filter driver 210 may be logically positioned between the application 202 and data storage 208. The file system filter driver 210 may perform various functions related to the management of application resources, for example, as described in more detail below.

Data storage 208 may include various application resource files 212, 214, 216. Each of the application resource files 212, 214, 216 may include a version of an application resource that is tailored to a specific hardware configuration and/or software configuration of the system. The hardware configuration of the system may describe, the processor family (e.g., x86, x64/AMD-64/EMT64T, ia64/Intel Itanium, etc.) as well as the type of other hardware components in the system (e.g., video adapter, monitor type, various chipsets, etc.). The software configuration of a system may describe, the operating system as well as other parameters including, for example, network configurations (e.g., local environment, remote environment, client environment, server environment, etc.). Files 212, 214 and 216 may each include a different version of a single application resource, with the version included in file 212 corresponding to a first system configuration, the version included in file 214 corresponding to a second system configuration, etc. In various embodiments, additional application resource files (not shown) may be provided to include configuration-specific versions of additional application resources. Also, it will be appreciated that versions of application resources may be provided for any suitable number and/or combination of hardware/software configurations.

Figure 3:
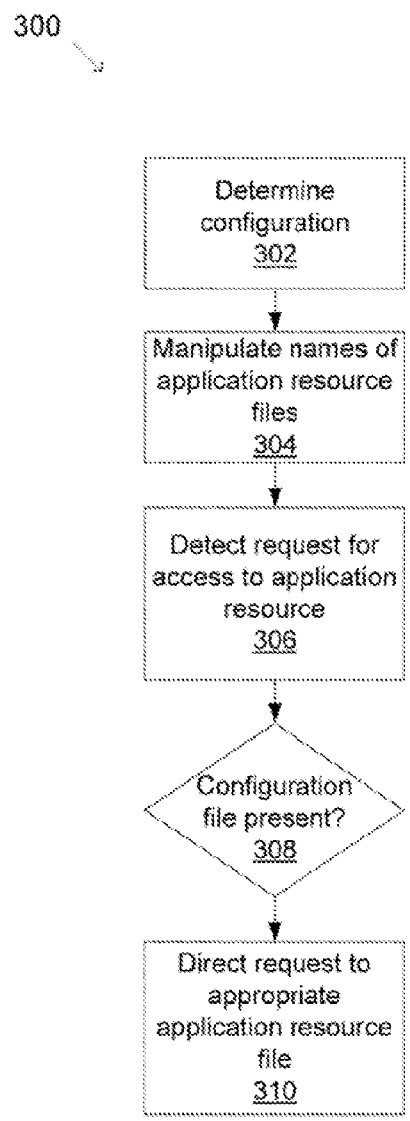
FIG. 3 shows a process flow for managing application resources according to various embodiments of the present invention.

FIG. 3 shows a process flow 300, according to various embodiments, for managing application resources in the architecture 200. At step 302 the hardware/software configuration of the system may be determined. This step may be performed by various components of the architecture 200 including, for example, the file system filter driver 210, the operating system 204, an application 202 having functionality for determining the hardware configuration, etc. At step 304, the file system filter driver 210 may manipulate the names of application resource files 212, 214, 216 based on the determined hardware/software configuration. For example, if the determined configuration corresponds to the application resource version stored at file 212, then file 212 may be renamed, from the perspective of an application 202, with the file name that the application 202 expects the particular application resource to have.

At step 306, the application 202 may make a request for the application resource, in this example, the application resource stored at files 212, 214, 216. The file system filter driver 210 may intercept the request between the application 202 and data storage 208. At step 308, the file system filter driver 210 may determine if a version of the application resource corresponding to the determined configuration is present at data storage 208. If the correct application resource version is present, then the file system filter driver 210 may direct the request to the appropriate application resource file (e.g., 212, 214, 216) at step 310. It will be appreciated that, in various embodiments, the file system filter driver 210 may be omitted, and its functions may be performed by other components (e.g., the operating system 204).

Figure 4:
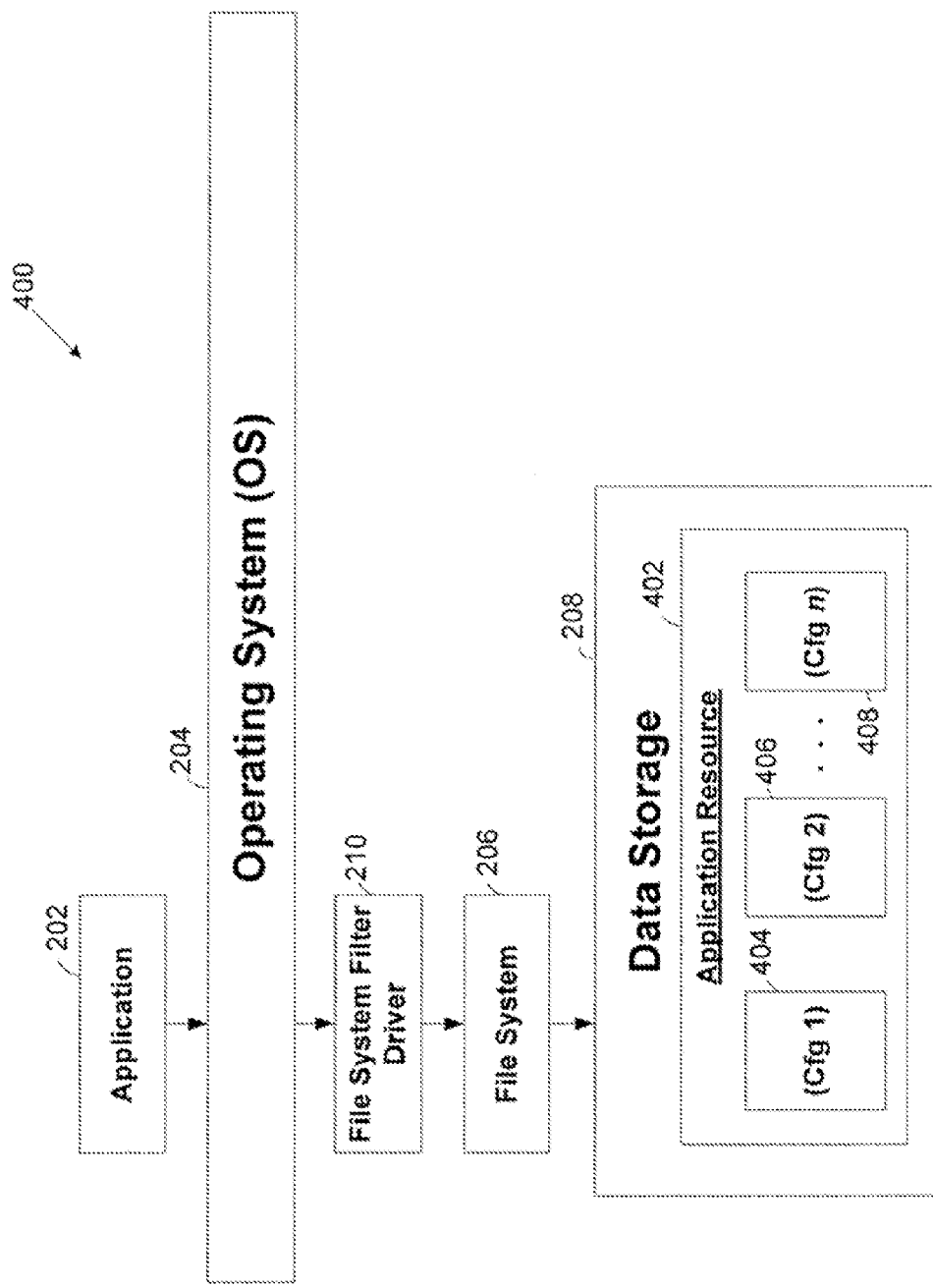
FIG. 4 shows a diagram of a system architecture according to various embodiments of the present invention.

FIG. 4 shows a system architecture 400 according to various embodiments, for managing application resources. In the architecture 400, data storage 208 includes one or more data files (e.g., 402). Each data file(s) may correspond to a different application resource and may include different configuration-specific versions of its respective application resource in one or more streams or sub-files. For example, the file 402 may include a first configuration-specific version of an application resource at stream 404, a second configuration-specific version of the application resource at stream 406, and a third configuration-specific version of the application resource at stream 408. It will be appreciated that the data file 402 may include more or fewer configuration-specific streams than are shown. Also, in various embodiments, additional data files (not shown) may be provided. The additional data files may include streams having configuration-specific versions of additional application resources.

Figure 5:
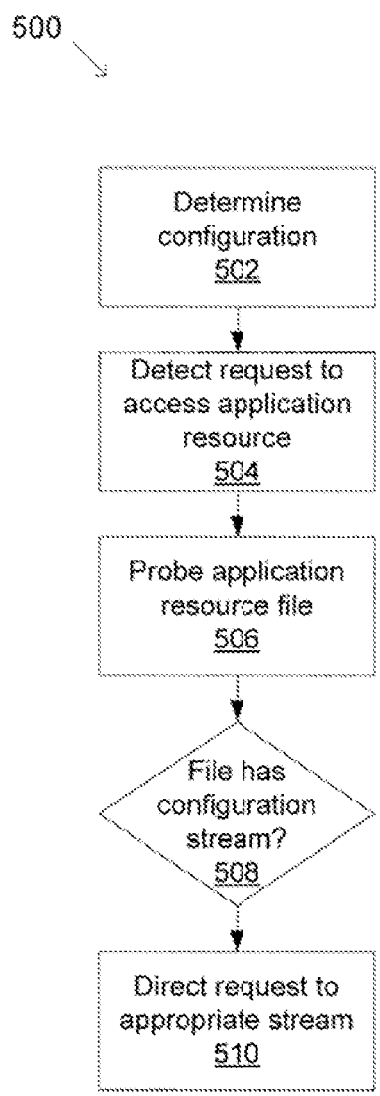
FIG. 5 shows a process flow for managing application resources according to various embodiments of the present invention.

FIG. 5 shows a process flow 500, according to various embodiments, for managing application resources in the architecture 400 of FIG. 4. At step 502, the hardware/software configuration of the system may be determined, for example, as described above. At step 504, the file system filter driver 210 may detect a request to access an application resource, in this example, the application resource corresponding to file 402. The request may originate, for example, from the application 202. At decision step 506, the file system filter driver 210 may determine whether the data file 402 includes a stream having a version specific to the sensed system configuration. If so, the file system filter drive 210 may direct the request to the appropriate stream of the file 402. Again, it will be appreciated that, in various embodiments, the file system filter driver 210 may be omitted and its functionality may be performed by various other components including, for example, the operating system 204.

Figure 6:
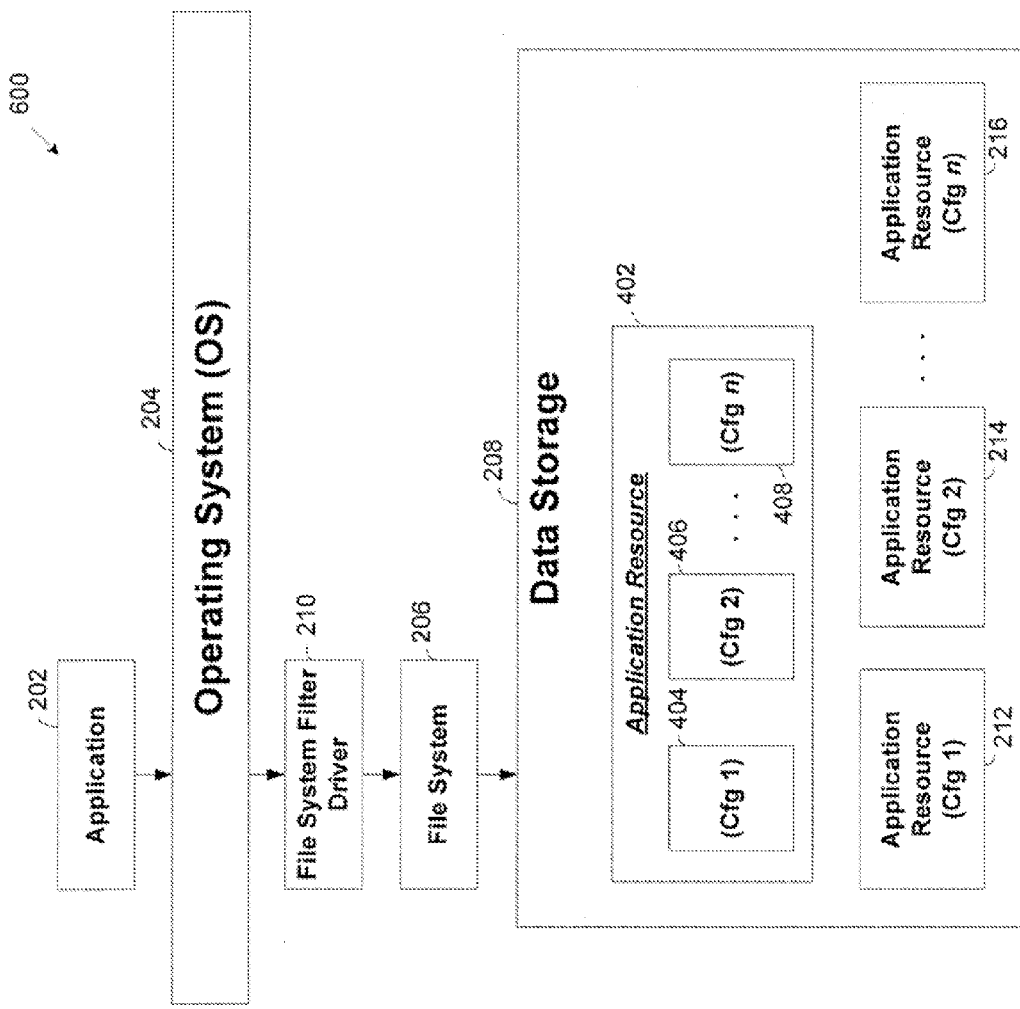
FIG. 6 shows a diagram of a system architecture according to various embodiments of the present invention.

It will be appreciated that aspects of the architectures 200 and 400 may be used together. For example, FIG. 6 shows another system architecture 600 including various stream-based application resource files (e.g. 402) as described above with respect to architecture 400, as well as various application resource files (e.g., 212, 214, 216) as described above with respect to architecture 200. In this example, files 402, 212, 214, 216 may all include configuration-specific versions of a single application resource. It will be appreciated, though, that additional files (not shown) may include configuration-specific versions of additional application resources.

Figure 7:
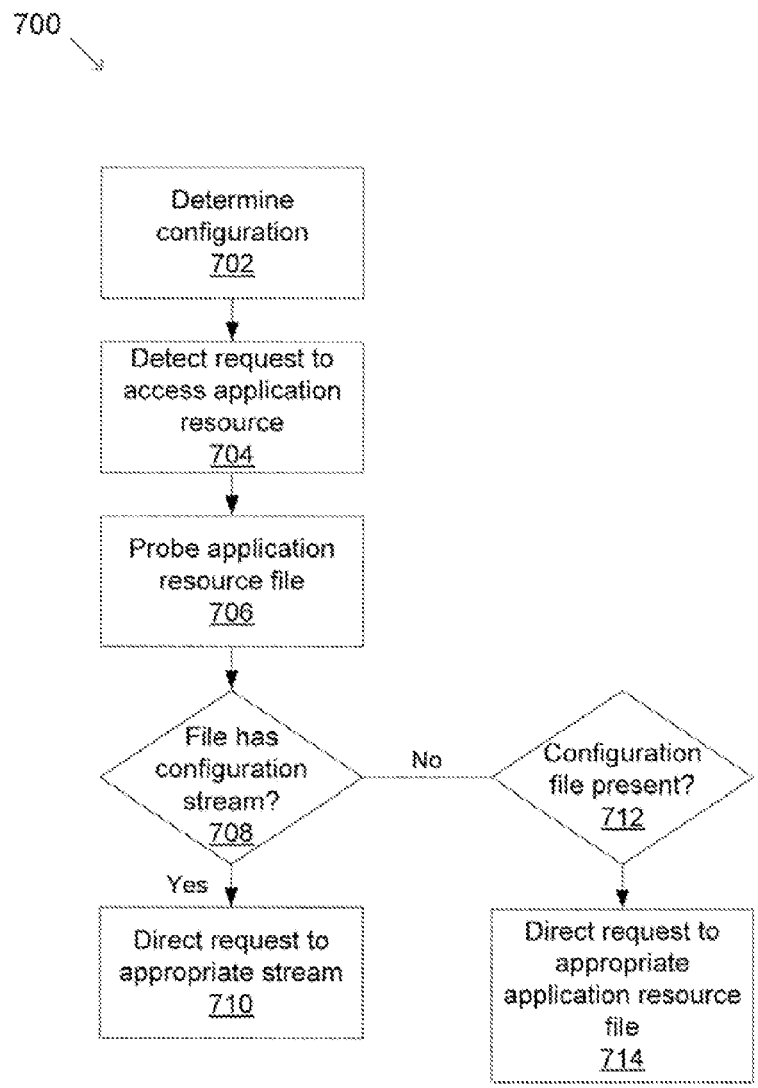
FIG. 7 shows a process flow for managing application resources according to various embodiments of the present invention.

FIG. 7 shows a process flow 700 for managing application resources using the architecture 600. At step 702, the configuration of the system may be determined, for example, as described above. At step 704, a request to access an application resource may be detected, for example, by file system filter driver 210. The file system filter driver 210 may then determine at 706 if a file 402 corresponding to the requested application resource includes a stream 404, 406, 408 corresponding to the system configuration. If so, then the request may be directed to the appropriate stream 404, 406, 408 at step 708. If the file 404 does not include the desired configuration-specific version of the application resource, then, at step 710, the file system filter driver 210 may determine if a configuration-specific version of the application resource exists in a stand-alone file (e.g., 212, 214, 216). If so, then the file system filter driver 210 may direct the request to the appropriate file 212, 214, 216.

Figure 8:
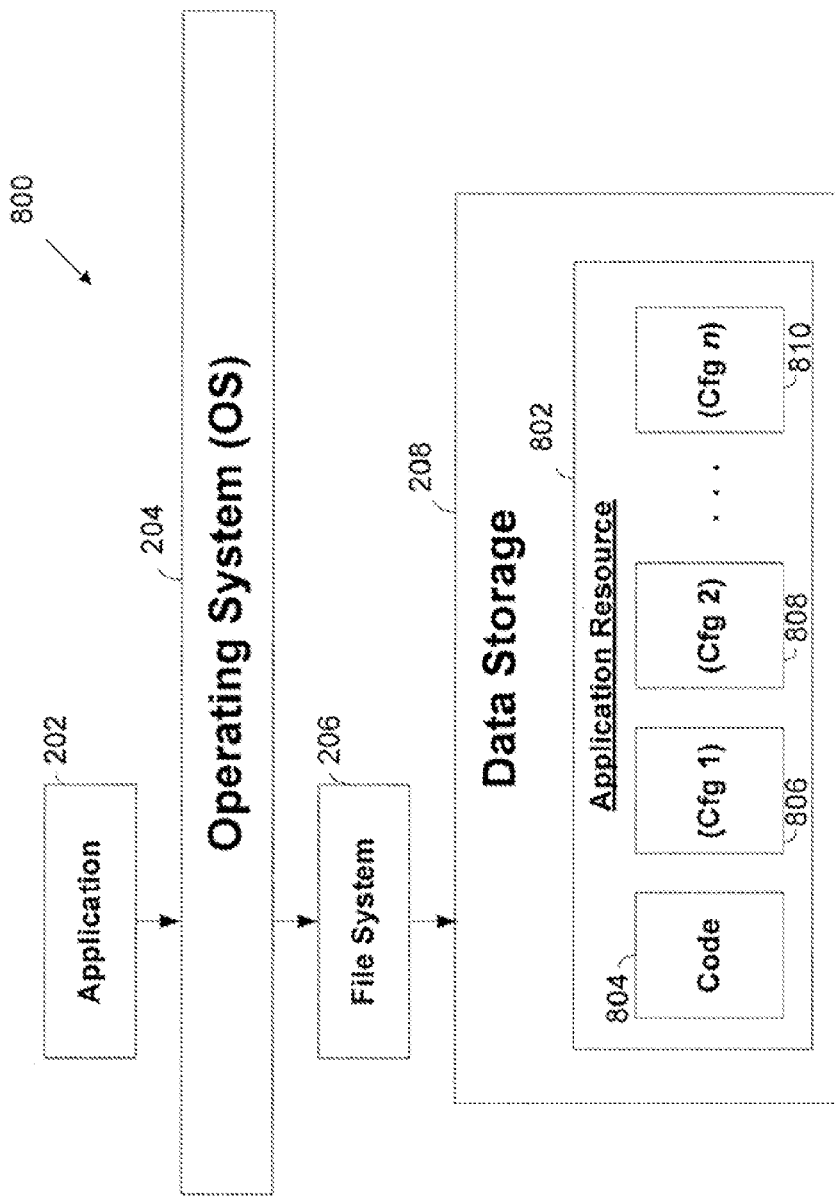
FIG. 8 shows a diagram of a system architecture according to various embodiments of the present invention.

FIG. 8 shows yet another system architecture 800, according to various embodiments, for managing application resources. The architecture 800 includes one or more application resource files 802. The application resource file 802 includes streams 806, 808, 810 having configuration-specific versions of application resources, for example, as described above. The file 802 also includes a generally executable code stream 804 that may include a generally executable code that performs some or all of the functionality performed by the file system filter driver 210 in the embodiments described above. In various embodiments, the executable code may be in a format that can be executed across multiple hardware configurations. For example, the executable may be written in a script language, an interpreted language or in any legacy format (e.g., x86 format, binary format, etc.). In various embodiments, the executable code may be a generally executable script that senses the configuration of the system and selects a version of a second portion of executable code specific to the configuration. Versions of the second portion of executable code may be stored in various other streams included in the file 802. It will be appreciated that the executable stream 804 may be placed in a default stream of the file 802, or a stream that is accessed automatically when the file 802 is accessed. It will also be appreciated that the file 802 may include more or fewer configuration-specific versions of application resources than are shown in FIG. 8. It will also be appreciated that additional files (not shown) may be provided having configuration-specific versions of additional application resources.

Figure 9:
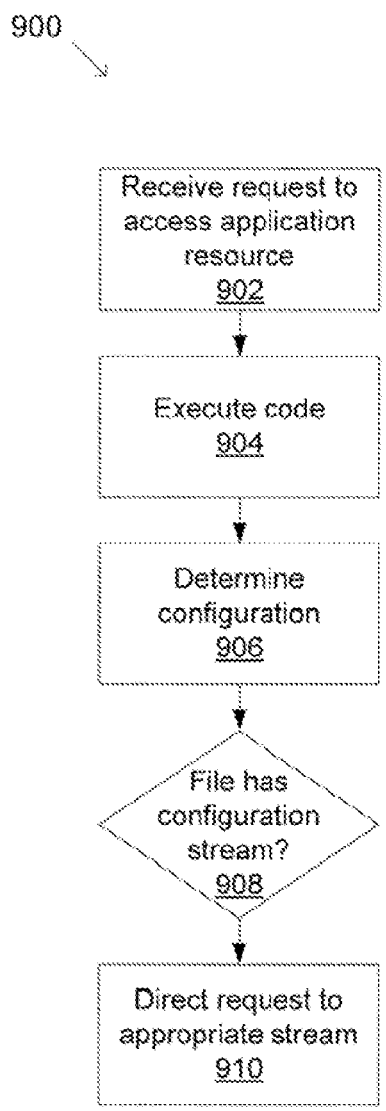
FIG. 9 shows a process flow for managing application resources according to various embodiments of the present invention.

FIG. 9 shows a process flow 900, according to various embodiments, for managing application resources in the architecture 800. At step 902, the application 202, or another system component, may request access to an application resource, in this case, the application corresponding to file 802. The request may be directed to file 802, for example, by the operating system 204 and/or file system 206. When the file 802 is accessed, the generally executable code contained in executable stream 804 may be launched. The code may sense the hardware configuration at step 906. At step 908, the code may determine if any of the other streams 806, 808, 810 of the file 802 include the appropriate configuration-specific version of the requested application resource. If so, then the code may direct the request to the appropriate stream of the file 802.

Figure 10:
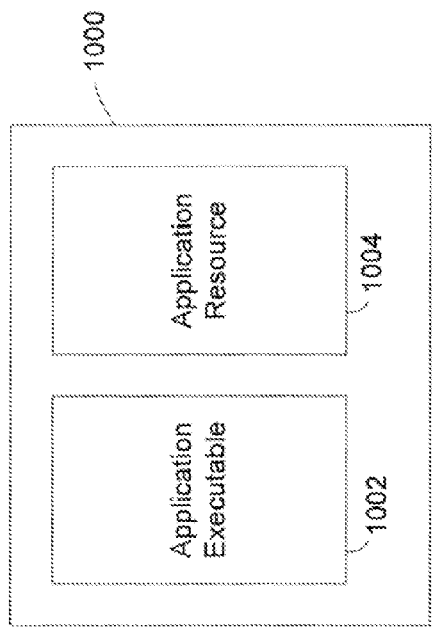
FIGS. 10 and 11 show diagrams of files according to various embodiments of the present invention.

Various embodiments may involve aggregating a series of application resources into one or more files. For example, FIG. 10 shows a file 1000. The file 1000 includes streams 1002 and 1004. Stream 1002 may include an application (e.g., an executable, other components, etc.). It will be appreciated, that, in various embodiments, the application may be stored at more than one stream. Stream 1004 may include an application resource, which may be, for example, an application driver or other component that facilitates communication between the application and other components or constructs of the system. The file 1000 may be created, for example, when the application corresponding to the executable 1002 is installed, or may be pre-packaged into the form shown in FIG. 10 (e.g., by a software developer and/or provider). At runtime, the application resource 1004 may be extracted from the file 1000 rather than being retrieved from another system location. In this way, the application corresponding to the executable 1002 may remain functional even if other system copies of the application resource 1004 are overwritten.

Figure 11:
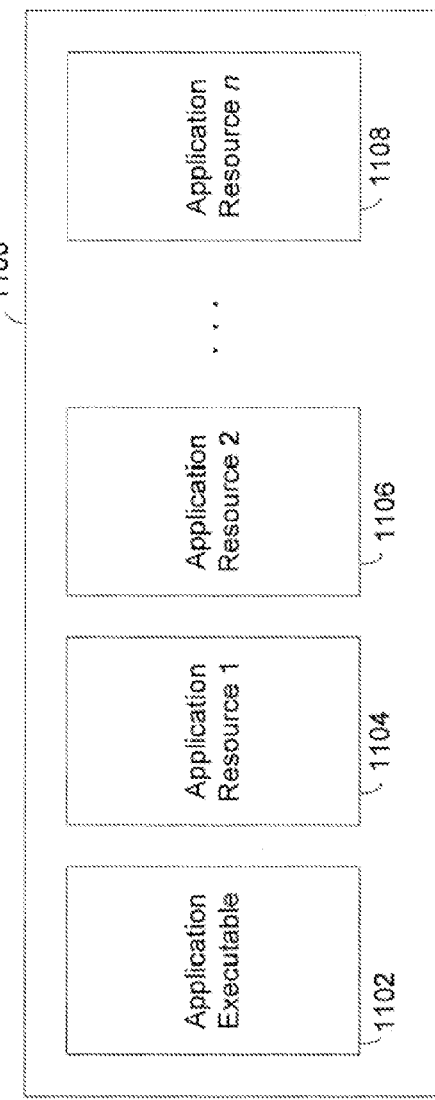

FIG. 11 shows another exemplary file 1100, according to various embodiments, including multiple application resources associated with a single application. The application executable may be included at stream 1102. The various application resources (e.g., all or a portion of those necessary to run the application) may be included at streams 1104, 1106, 1108. It will be appreciated that any number of streams 104, 1106 and 1108 may be included to contain any number of application resources. At run-time, the application resources of the executable 1102 may be retrieved from the various streams 1104, 1106, 1108 rather than from another system location. In this way, the application executable 1102 may be functional even if some or all of its application resources located at other system locations are overwritten. It will be appreciated that the executables and application resources may be assembled into file 1100 at install time. In various other embodiments, the file 1100 may be provided by a software developer/provider in a preassembled form.

At run time, the executables and application resources included in files 1000 and 1100 may be extracted according to any suitable method. For example, in various embodiments, a file system filter driver (not shown) may be logically positioned between the application and a data storage including the file 1000 and/or 1100. The file system filter driver may intercept requests from the application for any of the application resources included in the files 1000 and/or 1100 and direct them to the appropriate stream. Also, in various embodiments, this functionality may be implemented by an operating system. In additional embodiments, the files 1000 and/or 1100 may include a generally executable code that extracts the correct application resource upon request.

In various embodiments, the files 1000 and 1100 may include multiple versions of application resources, with the different versions tailored to different hardware configurations. For example, additional streams may be included in the file 1000 and/or the file 1100 with the additional streams including additional hardware-specific versions of application resources. In various embodiments, different hardware-specific versions of application resources may be. included in a single stream as sub-streams or streams within the stream.

As used herein, the term "data unit" refers to a group of related data. As used herein, the term "data file" refers to an organizational unit of data. For example, a data file may include one or more data units. In various non-limiting embodiments, a data file may be an application data file, a database record or a file containing some or all of an executable image, such as an application program, code library, device driver, operating system image file, etc. As used herein, the terms "sub-file" and "stream" refer to an organizational unit of data organized within a data file. For example, a sub-file or stream may include one or more data units. In a MICROSOFT WINDOWS environment, this concept may be called a "file system filter driver;" in a UNIX/Linux environment, it may be called a "layered" or "stackable" file system; and in MICROSOFT DISK OPERATING SYSTEM (MS-DOS), it may be called an INT21 or INT13 driver.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, a virtual computer system and/or any other computerized device or construct capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A method of managing application resources in a computer system, the method comprising:
   determining a configuration of the computer system;
   receiving a request to access an application resource;
   directing the request to a data file, wherein the data file includes a plurality of streams, and wherein each of the plurality of streams includes a configuration-specific version of the application resource;
   directing the request to a first stream of the plurality of streams, wherein the first stream includes a version of the application resource specific to the configuration, wherein the configuration comprises a software configuration describing at least one of the group consisting of an operating system of the computer system and a network parameter of the computer system; and directing the request to a second data file, wherein the second data file includes a version of the application resource directed to the configuration, if none of the plurality of streams includes a version of the application resource directed to the hardware configuration.

2. The method of claim 1, wherein the configuration comprises at least one aspect of a hardware configuration.

3. The method of claim 2, wherein the at least one aspect of the hardware configuration describes a processor family of the computer system.

4. The method of claim 1, wherein the directing the request to a first stream is performed by a file system filter driver.

5. The method of claim 1, wherein the directing the request to a first stream is performed by an operating system.

6. A system for managing application resources in a computer system, the system comprising:

data storage, the data storage comprising a data file, wherein the data file comprises a plurality of streams, wherein each of the plurality of streams includes a configuration-specific version of an application resource, and wherein the data storage further comprises a plurality of files, wherein each of the plurality of files comprises a configuration-specific version of the application resource;

an application resource module configured to:
receive a request for the application resource and direct the request to a first stream of the plurality of streams, wherein the first stream includes a version of the application resource specific to a configuration of the computer system, wherein the configuration comprises a software configuration describing at least one of the group consisting of an operating system of the computer system and a network parameter of the computer system; and direct the request to one of the plurality of data files comprising a version of the application resource specific to a configuration of the computer system, if none of the plurality of streams comprise an appropriate version of the application resource.

7. The system of claim 6, wherein the data storage further comprises a second data file comprising a second plurality of streams, and wherein each of the second plurality of streams includes a configuration-specific version of a second application resource, and wherein the application resource module is further configured to receive a second request for the second application resource and direct the second request to a stream of the second plurality of streams, wherein the stream includes a version of the application resource specific to the configuration of the computer system.

8. The system of claim 6, wherein the configuration comprises at least one aspect of a hardware configuration.

9. The system of claim 8, wherein the at least one aspect of the hardware configuration describes a processor family of the computer system.

10. The system of claim 6, wherein the application resource module comprises a file system filter driver.

11. The system of claim 6, wherein the application resource module is a part of an operating system of the computer system.

12. The system of claim 6, wherein the data file comprises a second stream, and wherein the application resource module is embodied as a generally executable code present at the second stream.

13. A method of managing application resources in a computer system, the method comprising:

directing a request for an application resource to a data file, wherein the data file comprises a plurality of streams comprising configuration-specific versions of the application resource and a second stream comprising an executable code;

executing the executable code, wherein executing the executable code causes at least one processor associated with the computer system to perform the following steps:
determining a configuration of the computer system;
selecting a stream of the data file that comprises a version of the application resource specific to the configuration; and
returning the version of the application resource specific to the configuration in response to the request
calling a second executable code specific to the configuration, wherein the second executable code causes the processor associated with the computer system to perform the steps of:
selecting a stream of the data file that comprises a version of the application resource specific to the configuration; and
returning the version of the application resource specific to the configuration in response to the request.

14. The method of claim 13, further comprising directing a second request for a second application component to a second data file, wherein the second data file comprises a plurality of streams comprising configuration-specific versions of the second application resource and a default stream comprising a second executable code.

15. The method of claim 13, wherein the configuration comprises at least one aspect of a hardware configuration.

16. The method of claim 13, wherein the at least one aspect of the hardware configuration describes a processor family of the computer system.

17. The method of claim 13, wherein the configuration comprises a software configuration describing at least one of the group consisting of an operating system of the computer system and a network parameter of the computer system.

18. The method of claim 13, wherein the executable code comprises at least one of the group consisting of a script and an executable capable of being executed by a plurality of hardware configurations.

19. The method of claim 13, wherein the executable code is a generally executable script.

20. The method of claim 13, wherein the second stream is a default stream of the data file.

21. A method of managing application resources in a computer system, the method comprising:

directing a request for an application resource to a data file, wherein the data file comprises a plurality of streams comprising configuration-specific versions of the application resource and a second stream comprising an executable code;

executing the executable code, wherein executing the executable code causes at least one processor associated with the computer system to perform the following steps:
determining a configuration of the computer system;
selecting a stream of the data file that comprises a version of the application resource specific to the configuration; and returning the version of the application resource specific to the configuration in response to the request; wherein the selecting and the returning comprise calling a second executable code specific to the configuration, wherein the second executable code causes the processor associated with the computer system to perform the steps of:

selecting the stream of the data file that comprises a version of the application resource specific to the configuration; and returning the version of the application resource specific to the configuration in response to the request.

* * * * *